US007336785B1

(12) United States Patent
Lu et al.

(10) Patent No.: US 7,336,785 B1
(45) Date of Patent: Feb. 26, 2008

(54) SYSTEM AND METHOD FOR COPY PROTECTING TRANSMITTED INFORMATION

(75) Inventors: Jin Lu, W. Croton-on-Hudson, NY (US); Martin Freeman, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/461,984

(22) Filed: Dec. 15, 1999

Related U.S. Application Data

(60) Provisional application No. 60/143,501, filed on Jul. 9, 1999.

(51) Int. Cl.
   *H04N 7/167* (2006.01)
(52) U.S. Cl. ..................................... 380/201
(58) Field of Classification Search ................. 380/201
   See application file for complete search history.

(56) References Cited

U.S. PATENT DOCUMENTS

| 5,799,081 | A | * | 8/1998 | Kim et al. ................... 380/203 |
| 5,987,126 | A | * | 11/1999 | Okuyama et al. ........... 380/203 |
| 6,055,314 | A | * | 4/2000 | Spies et al. ................. 380/228 |
| 6,550,008 | B1 | * | 4/2003 | Zhang et al. ................ 713/155 |
| 6,571,055 | B1 | * | 5/2003 | Sawabe et al. ............... 386/96 |

FOREIGN PATENT DOCUMENTS

| EP | 0763936 A2 | 3/1997 |
| EP | 0763936 A3 | 3/1997 |
| EP | 0924930 A2 | 6/1999 |
| EP | 924930 A2 * | 6/1999 |
| JP | 11086437 | 3/1999 |
| JP | 11176087 | 7/1999 |
| WO | WO 9856179 A1 * | 12/1998 |

OTHER PUBLICATIONS

ITU-T, "Transmission Technology—Generic Coding of Moving Pictures and Associated Audio Information: Systems"; ITU-T Recommendation H.222.0 (Jul. 1995).*
OpenCable POD Copy Protection System; IS-POD-CP-WD02-991027 (Rev 991008).*
SCTE, Society of Cable Telecommunications Engineers, Inc., Digital Video Subcommittee, SCTE DVS 131 Rev. 7, Date of Original Issue: Feb. 6, 1998.*
CED—Communications Engineering & Design, "OpenCable closing in on a standard"; Nov. 1998; http://www.cedmagazine.com/ced/9811/9811a.htm.*
Lafferty, M., OpenCable closing in on a standard, Nov. 1998, http://www.cedmagazine.com/ced/9811/9811a.htm.*

* cited by examiner

*Primary Examiner*—Nasser Moazzami
*Assistant Examiner*—Brandon S Hoffman

(57) ABSTRACT

To afford copy protection for information, e.g. elementary streams, from a service provider while in transit between a point of deployment (POD) module and a set-top box, the information is accompanied by control information pairs. The pairs are respectively associated with the portions of the copy protected information and are incorporated into a shared key calculation in the POD module and set-top box. The shared keys are used by the POD module and set-top box to encrypt and decrypt the information. Tampering with a control information pair, as by an intruder or hacker, prevents keys shared by the set-top box and POD module from matching. A mismatch prevents the set-top box from correctly decrypting information received from the deployment module.

30 Claims, 3 Drawing Sheets

SYSTEM AND METHOD FOR COPY PROTECTING TRANSMITTED INFORMATION

DOMESTIC PRIORITY CLAIM

The priority of U.S. Provisional Application No. 60/143,501, filed Jul. 9, 1999 is claimed.

FIELD OF THE INVENTION

This invention relates to a communication system and, more particularly, to a copy protection system for information transmitted between a deployment module, such as a point of deployment (POD) module, and a host device, such as a set-top box.

BACKGROUND OF THE INVENTION

Digital video and audio consumer electronics/devices are used by consumers to receive and conduct numerous services and transactions, for example, to receive video, audio and data streams from a (cable television) service provider, such as Emergency Alerting, Interactive Program Guides, Impulse Pay-Per-View (IPPV), Video On Demand (VOD), General Messaging, and Interactive Services.

In particular, one such device is a point of deployment (POD) module. A POD module is a removable card inserted into a host device, such as a set-top box. As is well known in the art, a POD module provides several functions including security that is physically separate from a set-top box's navigation function and processing out-of-band cable signals. For additional details on POD modules, see SOCIETY OF CABLE TELECOMMUNICATIONS ENGINEERS, INC. (SCTE) Document: SCTE DVS 131 Rev. 7, entitled "Draft Point-of-Deployment (POD) Module Interface Proposal" dated Dec. 3, 1998, (hereinafter known as "DVS131r7").

Consumers rely on such devices to communicate, access programs and services or engage in commercial transactions in which privacy and/or security is desired and, in many cases, expected. In this regard, the POD module also decrypts content information encrypted by service providers. It may be part of a so-called "conditional access" (CA) system that spans the head-end of a service provider network and the POD module itself.

To receive information from a particular service provider, a POD module that contains an algorithm related to a particular proprietary CA system, which is associated with a particular service provider, must be inserted to a host device. After content information is selected by the host device/viewer and received in the POD module from a service provider, it is decrypted in the POD module. The (decrypted) content information is again encrypted in the POD module with a new set of keys to protect it when transmitted across the POD/host interface.

The content information is transmitted in a so-called transport stream, which contains several elementary streams. An elementary stream may contain a video feed, a sound track or a data file. Copy protection is provided on the basis of elementary streams.

For every copy protected elementary stream, there is an associated Copy Control Information (CCI). It is used by the host device to decide (1) how many copies (e.g. one copy, zero copies) of the elementary stream can be made; (2) what copy formats are allowed (e.g. analog formats including composite and component and digital formats); and (3) other copy protection related activities. The CCI is passed from the POD module to the host device to indicate how the corresponding elementary stream of the content should be treated. To prevent an "intruder" from tampering with the CCI, it must be protected when transmitted to the host device.

Standard cryptographic methods exist for the general encryption/decryption within such a system, however, these methods each have significant limitations. In one such method a proprietary CA system, as well as its associated algorithms for encryption/decryption, is used. Instead of transmitting every CCI associated with an elementary stream in the content, this method transmits the most restrictive CCI to the host.

Although, the CCI is not encrypted when transmitted between the POD module and the host device, it is afforded some degree of protection. The CCI is typically embedded in shared keys that are used to encrypt the content information at the POD module and decrypt the content information when received by the host device.

One problem with this approach is that if the content contains multiple elementary streams, each elementary stream may have a different CCI. Since the host device uses the most restrictive CCI for its copy protection processing, content information may be prevented from being properly copied. For example, if there are two elementary streams, and the CCI associated with the first one indicates "copy once", while the CCI associated with the second one indicates "never copy", then neither of the elementary streams can be copied. This prevents a stream from being legally copied when another (possibly unrelated) stream has a more restrictive CCI.

Thus, there is a clear and present need for an effective means to provide copy protection that utilizes encryption, while still providing consumers with the information desired in a less restrictive manner. In particular, copy protection of information between a POD module and a set-top box.

SUMMARY OF THE INVENTION

The problems associated with copy protection of information, such as content information from a service provider, transmitted between a deployment module, such as a POD module, and a host device, such as a set-top box, are reduced or overcome by an arrangement in accordance with the principles of the present invention in which at least one control information pair is associated with the transmitted copy protected information, for example, one control information pair for each elementary stream relating to selected content information (e.g. a program from a cable service provider).

Specifically, the control information pair includes, in addition to copy control information (CCI), a stream identifier. The stream identifier uniquely identifies the transmitted copy protected information (or portion thereof e.g. an elementary stream).

In particular, it is an object of the present invention to eliminate the use of the most restrictive copy control information (CCI), when for example multiple content information or elementary streams are received by a deployment module.

In one illustrative embodiment, a Packet Identifier (PID) associated with each elementary stream of the transmitted copy protected information is used as the stream identifier for the respective elementary stream. A PID indicates the type of data stored in the packet payload. Preferably, the stream identifier is incorporated with the Packetized Elementary Stream (PES) header of the elementary stream. Since the PES header for copy protected information is encrypted during transmission between the deployment module and host device, the stream-identifier is in turn protected.

To help prevent hackers or intruders from illegally manipulating the copy protected information, the control information pair(s) is incorporated into shared (session) keys, which are generated respectively, on both the deployment module and the host device. Accordingly, if the control information pair(s) is tampered with, then the respective shared key(s) in the host and deployment module will not match. As a result, the host device will not be able to correctly decrypt the copy protected information encrypted by the deployment module with its shared key(s), thereby thwarting an intruder's attempt at illegally manipulating the copy protected information.

BRIEF DESCRIPTION OF THE DRAWING

The invention will be more readily understood after reading the following detailed description taken in conjunction with the accompanying drawing, in which.

DETAILED DESCRIPTION

Figure 1:
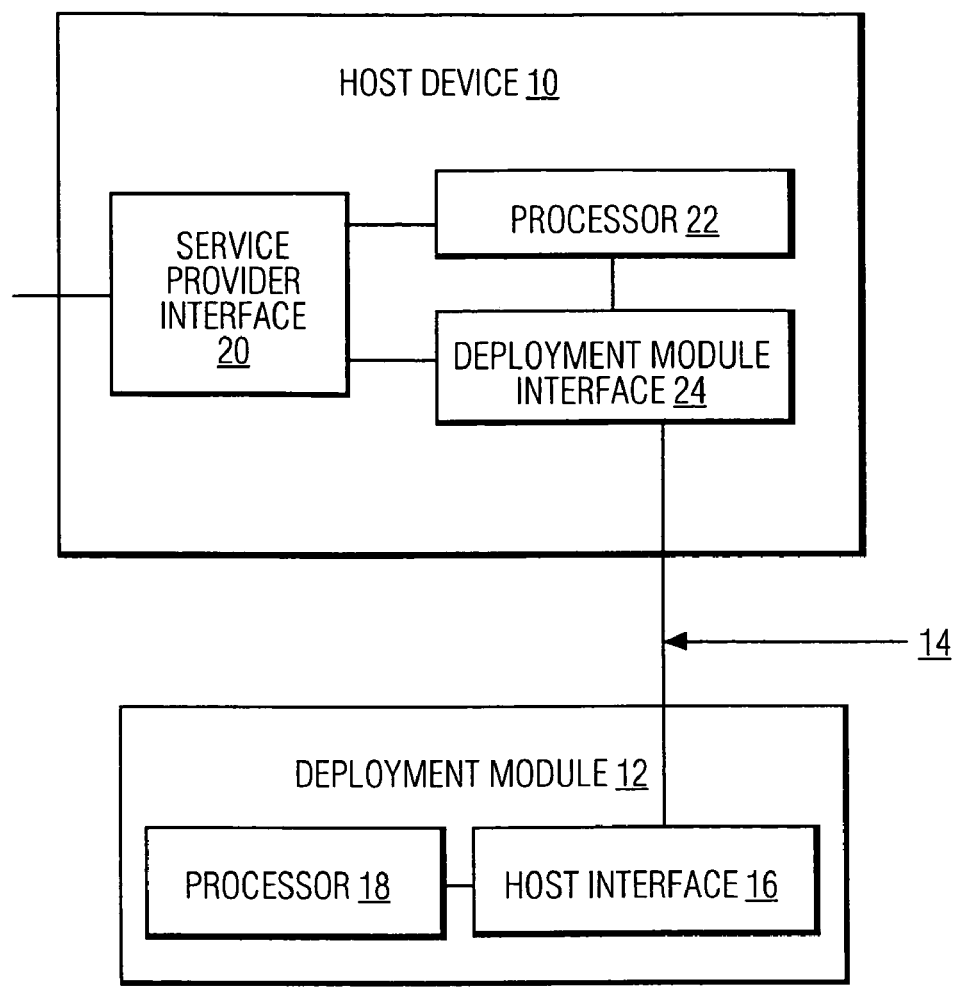
FIG. 1 illustrates an exemplary system in accordance with the principles of the present invention.

FIG. 1 is an exemplary system according to the principles of the present invention in which copy protection for information transmitted from a deployment module to a host device is implemented. It will be recognized that FIG. 1 is simplified for explanation purposes and that the full system environment for the invention will comprise, for example, a cable, fiber or satellite service provider network or provisions for network reliability through redundancy, all of which need not be shown here. The system illustratively includes a host device 10, such as a set-top box, and a deployment module 12, such as a point of deployment (POD) module, which communicate with each other through a communication medium 14, for example, wireless communication, electromagnetic card interface, optical communication, and the like.

Deployment module 12 includes a host interface 16 and a processor 18. Host interface 16 is used to communicate with host device 10 via medium 14. Host interface 16 may be any conventional system for allowing the transmission of information between the host device and the deployment module. For example, medium 14 may include a standardized bi-directional access to Out-Of-Band RF and in-band MPEG-2 Transport Stream input and output device.

Figure 2A:
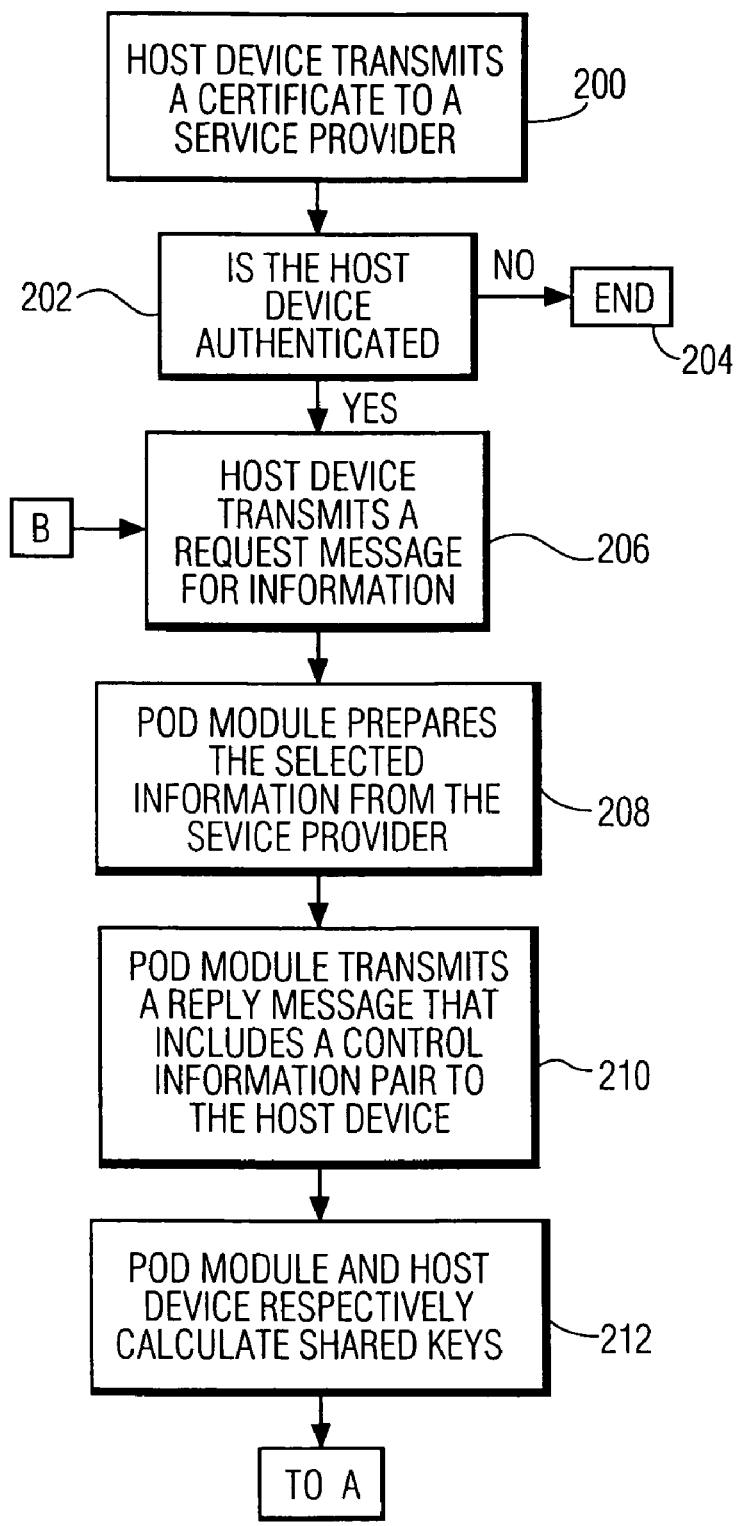
FIG. 2 is a flowchart depicting the process for copy protecting transmitted information in the system of FIG. 1.
Figure 2B:
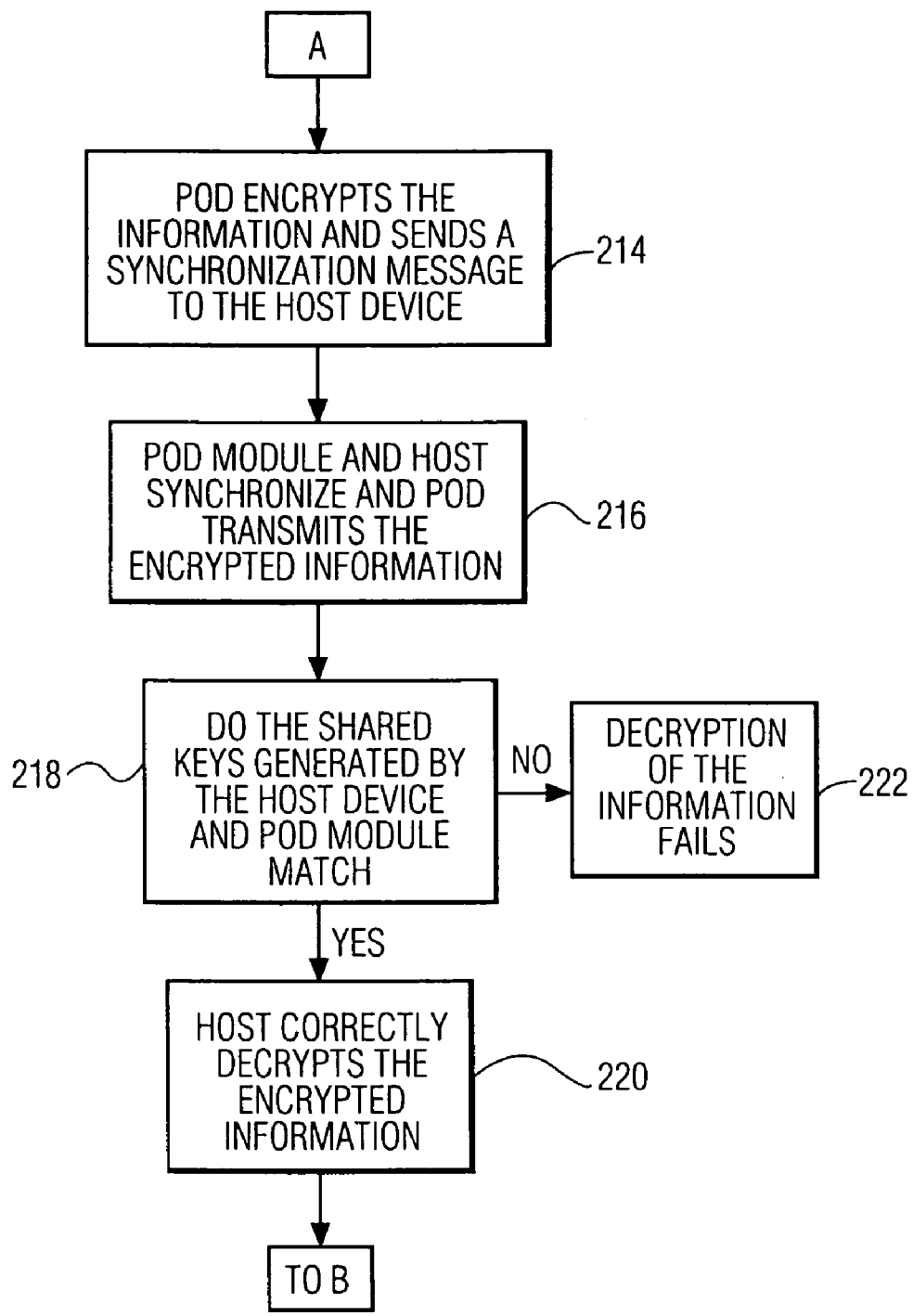

The majority of logic, control, supervisory, translation functions required for the operation of deployment module 12 is performed by processor 18 which also includes programs for the operations functionally described in FIG. 2. As described in detail below, execution of these program implements the functionality necessary to copy protect information. Processor 18 can be any of a number of commercially available processors, for example that may include dedicated digital signal processors (DSPs), a central processing unit (CPU) and memory chips.

Although deployment module 12 is described as a POD module, this arrangement is merely for convenience and it is to be understood that deployment modules are not limited to POD modules, per se. As used herein, the term "deployment module" refers to any type of (1) point of deployment module, (2) wireless, cellular or radio data interface appliance, (3) smartcard (4) personal computer, and (5) internet interface appliance, which facilitates the transfer of data, access remote services or engage in transactions and in which privacy and/or security is desired.

Host 10 communicates with deployment module 12 through communication medium 14. Host 10 includes a deployment module interface 24, which is arranged to operate with host interface 16, a server provider interface 20 and a processor 22.

Similar to the deployment module, the majority of logic, control, supervisory, translation functions required for the operation of host 10 are performed by processor 22 which also includes programs for the operations functionally described in FIG. 2. As described in detail below, execution of these programs implements the functionality necessary to copy protect information transmitted between a deployment module and a host. Processor 22 can be any of a number of commercially available processors, for example that may include dedicated digital signal processors (DSPs), a central processing unit (CPU) and memory chips.

The principles of the present invention are particularly useful for the copy protection of information or data transmitted between a POD module and a host device in a service provider communications network, such as a cable television network. However, it is to be understood that the steps described below in FIG. 2 are equally applicable to other devices described above.

FIG. 2 is a flow chart showing the steps carried out within the system of FIG. 1 to implement copy protection of information transmitted between a deployment module and a host device according to the principles of the present invention. The operation of copy protection in such communications networks is started by authenticating the host device using the deployment module.

With simultaneous reference to FIGS. 1 and 2, the process contemplated by the invention is initiated in step 200 of FIG. 2, when a host device, for example host device 10 of FIG. 1, transmits a certificate to a service provider (not shown) for host device authentication. The certificate, for example, includes a host ID. Typically, this step is carried out during a deployment module initialization, for example, when deployment module 12 of FIG. 1, is inserted into a card interface of host device 10 or host device 10 is powered up. If the certificate is not identified or is inconsistent with information at the service provider, then the host device is invalidated and the transaction is terminated. If the host device is authenticated in step 202, the process proceeds to step 206.

In step 206, when particular (content) information is selected, the host device notifies the deployment module via a request message. The particular information is selected, for example, by a user selecting a channel on cable television network. By looking at the electronic program guide (EPG), the host device determines which video, audio and/or data streams are contained in the selected information, for example, channel or programs. The request message also contains the PIDs of the elementary streams associated with the selected information.

In step 208, the deployment module, after receiving the selected PIDs from the request message, prepares to decrypt the elementary streams identified by the PIDs and then re-encrypt them for copy protection. Preparing the elementary stream decryption involves deriving session keys from a conditional access (CA) system, so that the deployment module can decrypt the selected information from the service provider. After this preparation is complete, in step 210, a reply message is sent from the deployment module to the host device to indicate that the deployment module is ready to decrypt the associated streams from the service provider. Included in the reply message is at least one control information pair associated with the selected information, and each pair having a stream identifier and a CCI.

Thereafter, in step 212, shared keys are calculated by the deployment module and host device, incorporating the control information pair(s), unlike the prior art that used only a CCI. The shared keys are a pair of keys (for example even and odd keys) shared by both the deployment module and the host device. Both the deployment module and the host device use the shared keys, respectively, to encrypt and decrypt information crossing the deployment module/host device interface. For the shared key calculation any of a number of methods can be used, see for example, Cable Television Laboratories specification entitled "OpenCablem™ POD Copy Protection System DRAFT REV 991008" Document: IS-POD-CP-WD02-991027, published on Oct. 27, 1999, (hereinafter "IS-POD-CP"), which is incorporated by reference herein. As is well known by persons skilled in the art, the shared key pair is a function of a number of factors, including random numbers, public keys exchanged between the deployment module and host device, and the Host ID.

Illustratively, the host device computes an ODD/EVEN key pair using a conventional hash function, for example, SHA-1 Secure Hash Algorithm (for further details on the SHA-1 hash function, see IS-POD-CP), where the control information pair(s) is represented by "streamer identifier-cci":

$$ODD_{Host}=SHA-1[N_{Host}|streamer\_identifier-cci|K_s|K_{cpss}]_{lsb56}$$

$$EVEN_{Host}=SHA-1[N_{Host}|streamer\_identifier-cci|K_s|K_{cpss}]_{msb56}$$

The deployment module's CA module computes an ODD/EVEN key pair using the SHA-1 has function:

$$ODD_{CA\_Module}=SHA-1[N_{Host}|N_{module}|streamer\_identifier-cci|K_s|K_{validated\_cpss}]_{lsb56}$$

$$EVEN_{CA\_Module}=SHA-1[N_{Host}|N_{module}|streamer\_identifier-cci|K_s|K_{validated\_cpss}]_{msb56}$$

where $N_{Host}$ and $N_{module}$ are two random numbers generated on the host device and deployment module respectively, $K_s$ and $K_{cpss}$ are two generated keys, lsb56 refers to the least significant 56 bits and msb56 refers to the most significant 56 bits, and streamer identifier-cci is calculated as follows, $$streamer\ identifier\text{-}cci=SHA-1[stream\ identifier1|CCI_1|\ldots|stream\ identifier_n|CCI_n]$$

where the stream identifier$_i$ and $CCI_i$ are the control information pair for elementary stream i.

In a preferred embodiment the stream identifier uniquely identifies an elementary stream and is inserted into the PES header associated with the elementary stream at the time a PID is assigned to the elementary stream. Preferably, this takes place in the head-end of the service provider network at the time a transport stream is generated from elementary streams. In particular, a 7-bit field in the PES header called "additional copy info" is available for copy protection, see International Telecommunication Union (ITU-T) Recommendation H.222.0/ISO/IEC 13818-1 (1996-04), entitled "Information Technology—Generic Coding of Moving Pictures and Associated Audio Information: Systems," which is incorporated by reference herein. The additional copy info field is used to store the stream identifier. A 7-bit number can support up to 128 different stream identifiers, which is typically enough for the number of copy protected elementary streams in one transport stream. After the host device has decrypted the encrypted PES, the stream identifier is retrieved.

After the deployment module finishes its calculation of the shared session key(s), it sends a synchronization message to the host device to indicate that it is ready to send the encrypted information to the host device, represented by step 214.

After the host device finishes its calculation of the shared session key(s), it synchronizes with the deployment module, and the deployment module transmits the encrypted information, represented by step 216.

The host device then begins to decrypt the encrypted information (e.g. the selected copy protected content information that has been encrypted with the shared key(s)). Accordingly, host device 10 is allowed to complete a transaction or receive the selected services. For example, the host device changes to a selected program channel of a cable service provider. However, if the shared key(s) do not match (for example, due to an attempt to tamper with the control information pairs), the decryption of the copy protected content fails, for example, viewers will only receive scrambled information, such as scrambled pictures. These steps are represented by steps 218-222. Thereafter, the user can select new information by returning to step 206.

Advantageously, even if an interloper intercepts a transmission between the host device and deployment module, he or she can not directly detect the stream identifier, since it is encrypted in the PES header. Thus, even if a CCI is detected, an interloper can not tamper with the selected information, for example, swap the PID fields associated with two streams. The possibility of such remapping is substantially reduced, since the stream identifiers are bound to their associated elementary streams and this binding is protected by encryption.

Finally, it is to be understood that although the invention is disclosed herein in the context of particular illustrative embodiments, those skilled in the art will be able to devise numerous alternative arrangements. Such alternative arrangements, although not explicitly shown or described herein, embody the principles of the present invention and are thus within its spirit and scope.

The invention claimed is:

1. A system for copy protecting information, the system comprising:
   a point of deployment module; and
   a set-top box including;
   wherein the set-top box transmits a request message for information, the point of deployment module generates a reply message which includes at least one control information pair, relating to the information, each control information pair having copy control information and a stream identifier, respectively generating a first key in the point of deployment module and a second key in the set-top box, using information associated with each respective device and the at least one control information pair, and the point of deployment module encrypting the information with the first shared key and transmitting the encrypted information to the set-top box, and the set-top box decrypting the encrypted information with the second shared key when the first and second shared keys match.

2. The system of claim 1, wherein to use the at least one control information pair in the generating of said second key the set-top box receives a transmission of said at least one control information pair, the respective copy control information of said at least one control information pair not being encrypted for the transmission.

3. The system of claim 1, wherein said stream identifier uniquely identifies an elementary stream that is assigned said copy control information.

4. The system of claim 3, wherein said stream identifier is within a Packetized Elementary Stream (PES) header of the elementary stream.

5. The system of claim 4, wherein the encrypted information to be transmitted to the set-top box includes said header, said set-top box being configured to retrieve said stream identifier from said header.

6. The system as recited in claim 1, wherein the information associated with each respective device is a random number generated by each respective device.

7. A method of copy protecting information transmitted between a deployment module and a host device, the method comprising the steps of:
 (a) transmitting a request message for the information from the host device to the deployment module;
 (b) transmitting a reply message from the deployment module to the host device, wherein the reply message includes at least one control information pair, each pair having a copy control information and a stream identifier;
 (c) generating a first shared key at the host and a second shared key at the deployment module, respectively, using information associated with each respective device and the at least one control information pair and an encryption means;
 (d) encrypting, in the deployment module, the information;
 (e) transmitting the encrypted information from the deployment module to the host;
 (f) decrypting, at the host, the encrypted information; and
 (g) receiving the information at the host when the first and second shared keys match.

8. The method of claim 7, wherein the deployment module is a point of deployment module.

9. The method of claim 7, wherein the host is a set-top box.

10. The method of claim 7, wherein the encryption means includes a hash function.

11. The method of claim 7, wherein the encrypted information in an elementary stream of information is encrypted with the first shared key.

12. The method of claim 11, wherein the stream identifier that is transmitted to the host is incorporated with the Packetized Elementary Stream (PES) header of the elementary stream.

13. The method of claim 7, wherein step b) is executed without encrypting said copy control information of said at least one control information pair.

14. A deployment module for use with a host device, the deployment module comprising:
 means for communicating with the host device; and
 a processor for, in response to a request message for information from the host device, generating a reply message to the host device, the reply message including at least one control information pair, each pair having copy control information and a stream identifier, generating a first shared key using information associated with the deployment module and the at least one control information pair, encrypting the information with the first shared key and transmitting the encrypted information to the host device.

15. The deployment module of claim 14, wherein the deployment module is selected from the group consisting of a point of deployment module, wireless data interface appliance, smartcard, personal computer or internet interface appliance.

16. The deployment module of claim 15, wherein the host device is a set-top box.

17. The deployment module of claim 16, wherein the encrypted information is transmitted to the host device using a transport stream, wherein the transport stream includes at least one elementary stream.

18. The deployment module of claim 17, wherein respective ones of the at least one control information pairs is associated with respective ones of the at least one elementary streams.

19. The deployment module of claim 14, wherein said copy control information of said at least one control information pair in the reply message is unencrypted upon transmission to the host device.

20. The deployment module of claim 14, wherein the information to be encrypted comprises content information.

21. The deployment module of claim 20, wherein said content information comprises content information of an elementary stream, said stream identifier being an identifier of an elementary stream.

22. A host device for use with a deployment module, the host device comprising:
 means for communicating with the deployment module; and
 a processor for generating a request message for information to the deployment module, and in response, receiving a reply message from the deployment module, wherein the reply message includes at least one control information pair, each pair having copy control information and a stream identifier, generating a second shared key using information associated with the host device and the at least one control information pair, and decrypting encrypted information, received from the deployment module, with the second shared key, and receiving the information when the second shared key matches a first shared key generated in the deployment module.

23. The host device of claim 22, wherein the deployment module is selected from the group consisting of a point of deployment module, wireless data interface appliance, smartcard, personal computer or internet interface appliance.

24. The host device of claim 23, wherein the host device is a set-top box.

25. The host device of claim 22, wherein the received encrypted information is included in a transport stream, wherein the transport stream includes at least one elementary stream.

26. The host device of claim 25, wherein respective ones of the at least one control information pairs is associated with respective ones of the at least one elementary streams.

27. The host device of claim 22, wherein said stream identifier uniquely identifies an elementary stream that is assigned said copy control information.

28. The host device of claim 27, wherein said stream identifier is within a Packetized Elementary Stream (PES) header of the elementary stream.

29. The host device of claim 28, wherein the encrypted information to be received includes said header, said host device being configured to retrieve said stream identifier from said header.

30. An article of manufacture comprising a computer readable medium in which resides a computer program, said article being part of a deployment module for use with a host device, said program comprising:
- instruction means for communicating with the host device; and
- instructions for, in response to a request message for information from the host device, generating a reply message to the host device, the reply message including at least one control information pair, each pair having copy control information and a stream identifier, generating a first shared key using information associated with the deployment module and the at least one control information pair, encrypting the information with the first shared key and transmitting the encrypted information to the host device.

* * * * *